(12) United States Patent
Challa et al.

(10) Patent No.: US 8,634,321 B2
(45) Date of Patent: Jan. 21, 2014

(54) PROXY AGENTS IN A NETWORK

(75) Inventors: Narsimha Reddy Challa, Andhra Pradesh (IN); Swaroop Jayanthi, Andhra Pradesh (IN); Sudheer Yetukuri, Andhra Pradesh (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 13/259,098

(22) PCT Filed: Dec. 18, 2009

(86) PCT No.: PCT/US2009/068637
§ 371 (c)(1), (2), (4) Date: Sep. 22, 2011

(87) PCT Pub. No.: WO2011/075131
PCT Pub. Date: Jun. 23, 2011

(65) Prior Publication Data
US 2012/0026870 A1 Feb. 2, 2012

(51) Int. Cl.
*H04L 12/26* (2006.01)

(52) U.S. Cl.
USPC .......................................................... 370/252

(58) Field of Classification Search
USPC ........... 370/229–231, 235–236.2, 241–241.1, 370/248, 252, 351, 431; 709/223, 226, 227, 709/229; 455/403, 422.1, 450, 453
See application file for complete search history.

(56) References Cited

U.S. PATENT DOCUMENTS

| | | | |
|---|---|---|---|
| 6,438,374 B1 * | 8/2002 | Bhat | 455/423 |
| 2003/0112752 A1 | 6/2003 | Irifune et al. | |
| 2005/0215265 A1 * | 9/2005 | Sharma | 455/453 |
| 2005/0257258 A1 | 11/2005 | Kinoshita et al. | |
| 2009/0077233 A1 * | 3/2009 | Kurebayashi et al. | 709/224 |
| 2009/0241176 A1 | 9/2009 | Beletski et al. | |
| 2011/0130092 A1 * | 6/2011 | Yun et al. | 455/39 |

* cited by examiner

*Primary Examiner* — Omar Ghowrwal

(57) ABSTRACT

Methods for network device management are described. Load balancing for one or more proxy agents 114, in a network 100, is implemented based on a threshold load and a threshold interval. The load on each of the proxy agents 114 is compared with the threshold load to determine whether a given proxy agent is overloaded, under-loaded, or balanced.

5 Claims, 8 Drawing Sheets

326

```
<CPA_ID>
    <IPAddress> </IPAddress>
    <Port>5988 </Port>
    <ManagedDevices>
            <ManagedDevice>
                    <RegistrationInfo>
                            <IPAddress> </IPAddresss>
                    </RegistrationInfo>
            </ManagedDevice>
            <ManagedDevice>
                    <RegistrationInfo>
                            <IPAddress> </IPAddresss>
                    </RegistrationInfo>
            </ManagedDevice>
    </ManagedDevices>
</CPA_ID>
```

Fig. 3a

PROXY AGENTS IN A NETWORK

BACKGROUND

Network based implementations allow a variety of network devices or resources to interact with each other. Such devices or resources interact with each other to perform a variety of functions, such as storing information, providing computing services, and executing routing requests. Presently known implementations allow storage of information on devices deployed in the network. To meet the growing demands of network storage, various storage-sharing architectures, such as storage area networks (SANs), have been developed. SANs are dedicated and complex networks that connect one or more hosts or servers to one or more storage devices and network subsystems, allowing transfer of data between them.

Storage sharing architectures, such as SANs, include one or more hosts, such as servers and general-purpose computers, that interact with storage devices or network subsystems over a communication network. The communication network is implemented using network devices, such as network switches, routers. The proper functioning of the SAN is dependent on the proper functioning of the storage and the network devices. These devices are managed by a Central Management Station (CMS). The CMS gathers information related to the storage devices and the network devices and implements device management based on this information. Examples of device information include device load, device availability, new devices, inactive devices, device status, certain control functions, etc.

The CMS obtains device information using a number of proxy agents. The proxy agents are deployed in the network and associated with the one or more of hosts, network and storage devices. The proxy agents facilitate management of the devices by collecting and reporting information about the devices to the CMS. The proxy agents may report the device information periodically or in response to a request from the CMS.

A single proxy agent is responsible for collecting the device information of a particular device. The proxy agents collect and report device information in response to a request from the CMS. At a given time, some of the proxy agents may be handling more requests than other proxy agents and may consequently be overloaded. Further, during operations, new proxy agents may get added to the SAN and some proxy agents may fail. Due to the complex nature of the SAN, it is difficult for the CMS to locate newly added or failed proxy agents, especially where the number of proxy agents is large.

BRIEF DESCRIPTION OF THE DRAWINGS

The detailed description is described with reference to the accompanying figures. In the figures, the left-most digit(s) of a reference number identifies the figure in which the reference number first appears. The same number is used throughout the drawings to reference like features and components.

FIG. 3a illustrates an exemplary format in which the proxy agents communicate relevant information to the gateway according to an embodiment of the present invention.

DETAILED DESCRIPTION

Figure 1:
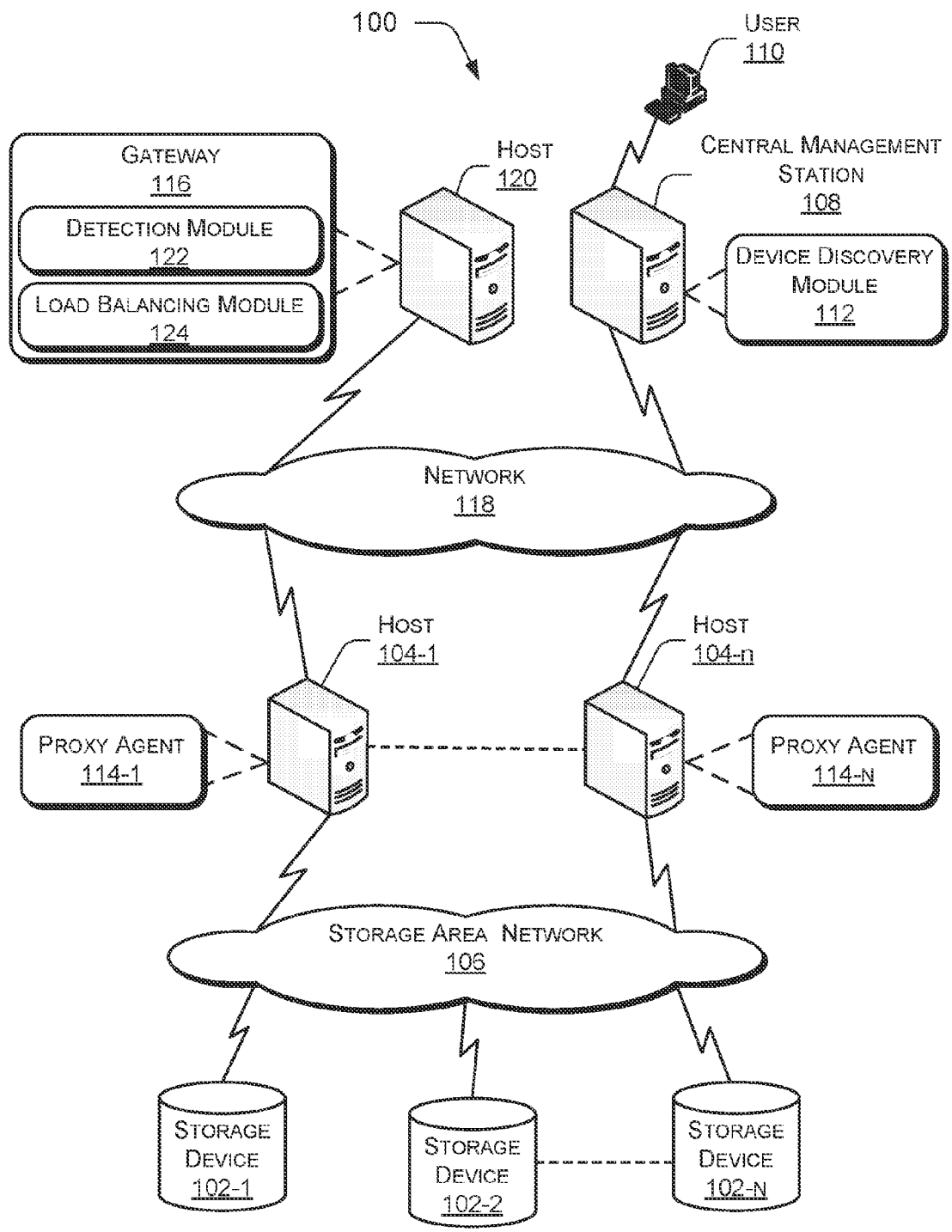
FIG. 1 illustrates an exemplary network environment for implementing network device management, according to an embodiment of the present invention.

Devices and methods for management of devices or resources in a network are described. Examples of such networks include, but are not limited to, storage area networks (SANs). SANs can be deployed as part of a network that includes the network resources or devices, or as an independent network itself. SAN, like other networks, can include one or computing devices, storage devices, etc. Computing devices can include computing resources or devices, such as hosts or servers, storage devises, etc. SANs are dedicated and complex networks that connect one or more hosts or servers to one or more storage and network devices for data transfer between them. Examples of devices include, but are not limited to, network switches, SAN switches, storage devices, HBAs, etc.

The efficient working of the SAN can be managed by a central management station (CMS) running a management application, such as a storage resource management (SRM) application. The SRM application interacts with the SAN, its components, and one or more storage devices through one or more proxy agents. Typical systems support one proxy agent per device. The proxy agents collect information associated with the SAN network devices and the storage devices, and report the same to the SRM application. Based on the information reported by the proxy agents, the SRM application monitors, controls and configures the attributes that may be directly or indirectly related to the functioning of the devices using management requests. Examples of such attributes include connectivity, topology, device availability, events details, etc., associated with the SAN network devices and the storage devices. Furthermore, the proxy agents also communicate with the SAN network devices and the storage devices, either over the same or a different network.

During operation, the proxy agents are loaded by the management requests made to it by the CMS. However, the proxy agent may get overloaded due to a large number of pending requests, for example, requests for collecting device information or other statistical information associated with the device. If the proxy agents in the storage network are overloaded, they may become slow to respond or may fail to respond to requests for the device information. Since a proxy agent is associated with one device, any failed proxy agent would result in the information of the device becoming unavailable to the SRM application running on the CMS. In such a case, the SRM application would not be able to manage the functioning of the device.

To overcome such situations, systems and methods for network and storage device management are described. In one implementation, the device management includes load balancing and automatically managing failover of the proxy agents in a SAN. The proxy agents manage the associated network devices and the storage devices by monitoring, discovering and collecting device information for reporting to the SRM application installed in the CMS. Typically, proxy agents execute at certain intervals and thus remain idle for the remaining time. In the course of their execution, some of the proxy agents may be overloaded, under-loaded, or balanced. Load balancing ensures that the proxy agents are loaded rationally, i.e., all proxy agents are more or less equally loaded for their proper functioning within the SAN. In case it is detected that a certain proxy agent is overloaded or has failed, subsequent requests can be routed to other proxy agents based on their load. Systems and methods described herein can allow multiple devices, storage devices and network devices, to be associated with a single proxy agent.

To this end, a load balancing gateway is provided to monitor and obtain device information. The device information is collected by one or more proxy agents that are associated with the devices. The load balancing gateway acts as a router, routing requests from the SRM application to the relevant proxy agents. The proxy agents to which the requests have to be routed are determined based on the loading of the respective proxy agents. In response to such requests, the proxy agents collect and report device information to the SRM application. The device information forms the basis for monitoring and controlling the functioning of the storage devices and the network devices. Examples of device information include, but are not limited to, IP address of the proxy agent, list of the devices managed by the proxy agent along with their IP address, etc. In one implementation, the load balancing gateway is implemented as a lightweight application for routing management requests to the respective proxy agents. The load balancing gateway, in different implementations, may be installed on the CMS or on any other host in the SAN network.

Furthermore, new proxy agents can be added to the network and subsequently registered with the load balancing gateway. Once registered, the load balancing gateway manages the devices associated with the newly added proxy agents.

In one implementation, the load balancing gateway is configured to automatically discover one or more proxy agents in the SAN. For this purpose, the load balancing gateway sends or broadcasts periodic request messages over the network, requesting information from the proxy agents that are deployed within the SAN. The load balancing gateway, based on the responses received, determines the proxy agents that were recently added to the SAN. The recently added proxy agents, once identified, are registered with the load balancing gateway.

In one implementation, the load balancing gateway is configured to determine whether a proxy agent has failed. The load balancing gateway classifies a proxy agent as failed, if it fails to respond to the request messages broadcasted by the gateway.

In one implementation, the load balancing gateway can also be detected by proxy agents. In such a case, one or more proxy agents may broadcast request messages. The load balancing gateway receives the request messages and transmits a response to the respective proxy agents from which the request messages were received. On receiving the response, the proxy agents register with the load balancing gateway. In one implementation, the proxy agents register with the load balancing gateway based on its relevant information, for example, IP address, devices associated with the proxy agents, etc.

In another implementation, the load balancing gateway is configured to monitor and determine the load on the proxy agents, i.e., the number of SAN management requests handled by each of the proxy agents, during a given time interval. The management requests include instructions that when executed monitor, control, and configure attributes that may be directly or indirectly related to the functioning of the devices. The management requests can be initiated from a user or a management application, say the SRM application installed on a Central Management Station (CMS).

The load balancing gateway implements load balancing based on at least a threshold load and a threshold interval. Once these parameters are obtained, the load balancing gateway compares the load on each of the proxy agents with the threshold load for the given threshold interval. Based on the comparison, the load balancing gateway determines whether the proxy agents are overloaded, under-loaded, or balanced. The load balancing gateway transfers the load handled by an overloaded proxy agent to an under-loaded or balanced proxy agent. In one implementation, the load balancing gateway routes subsequent management requests to the under-loaded or balanced proxy agents.

The manner in which load balancing and automatic management of failover of the proxy agents is implemented, shall be explained in detail with respect to the FIGS. 1-7. While aspects of the described systems and methods can be implemented in any number of different computing systems, environments, and/or configurations, the embodiments are described in the context of the following exemplary system architecture(s).

FIG. 1 shows an exemplary network 100 for network device management, according to an embodiment of the present invention. The network 100 includes one or more storage devices 102-1, 102-2, 102-m (collectively referred to as storage devices 102) and one or more hosts 104-1, 104-2, 104-n (collectively referred to as hosts 104). In one implementation, the storage devices 102 includes tape libraries, disk arrays, Just a Bunch Of Disks (JBODs), Redundant Array of Independent Disks (RAID), floppy disk drives, optical disk drives, etc. The storage devices 102 and the hosts 104 communicate over a communication network, such as a storage area network (SAN) 106.

The SAN 106 may be a wireless network, wired network, or a combination thereof. The SAN 106 can also be an individual network or a collection of many such individual networks, interconnected with each other and functioning as a single large network, e.g., the Internet or an intranet. Furthermore, the SAN 106 includes network devices, such as network switches, hubs, routers, HBAs, for providing a link between the hosts 104 and the storage devices 102. The network devices within the SAN 106 interact with the hosts 104 and the storage devices 102 through communication links, such as fiber channel links, internet small computer systems interface (iSCSI). As will be known, the hosts 104 can include servers, and/or other computing devices in a network. For instance, the hosts 104 may include workstations, personal computers, or servers for managing network resources.

The network 100 further includes a central management station 108, hereinafter referred to as CMS 108, for managing the SAN 106. In one implementation, the CMS 108 is a computing device running a management application, such as a storage resource management (SRM) application. As mentioned previously, the SRM application installed on the CMS 108 can be used for monitoring, controlling, and configuring connectivity, topology, device availability, events details, etc.

The CMS 108 can be connected to one or more users, such as a user 110, interacting with the CMS 108 for accessing information related to the SAN 106. In one implementation, the requests for accessing information related to the SAN 106 may be received via a device discovery module 112 included in the CMS 108.

The hosts 104 further include proxy agents 114-1, 2 . . . , n, collectively referred to as proxy agents 114, for managing the storage devices 102 and the network devices in the SAN 106 based on management requests received, for example, from the CMS 108. The proxy agents 114 operate in conjunction with the CMS 108 to manage the storage devices 102 and the network devices in the SAN 106, collectively referred to as devices 102 and 106, by obtaining relevant device-related information, such as device availability, addition or removal of a device, the number of devices 102 and 106 being managed at a time, the IP address of the devices, etc. As mentioned previously, each of the proxy agents 114 is loaded owing to one or more pending management requests received, for example, received from the CMS 108.

The proxy agents 114 are configured to communicate with the CMS 108 via a load balancing gateway 116, hereinafter referred to as gateway 116, included in the network 100. The proxy agents 114 provide their relevant information to register with the gateway 116 and send information associated with the devices 102 and 106 to the gateway 116. Once registered, the gateway 116 can monitor the proxy agents 114 and periodically update information associated with the proxy agents 114. Examples of such information includes, but is not limited to, number of pending requests with the proxy agents, load information, devices 102 and 106 managed by the proxy agents 114, IP address of the devices 102 and 106, etc. The gateway 116, in one implementation, is installed on the CMS 108. In one implementation, the proxy agents 114 are installed on the devices 102 and 106. In another implementation, the working of the proxy agents 114 and the devices 102 and 106 is based on the SNMP protocol.

The CMS 108, the proxy agents 114, and the gateway 116 communicate with each other over a network 118. The network 118 can be implemented as a network separate from the SAN 106 or can be implemented as a part of the SAN 106. As known in the art, the network 118 can include a plurality of computing devices, hosts, servers, switches, etc. The gateway 116 is installed on a host 120. The host 120 can be implemented as one or more servers, other computing devices, etc. For instance, the hosts 120 can be one or more workstations, personal computers, servers, etc. In one implementation, the gateway 116 can be installed on the CMS 108.

The gateway 116 further includes a detection module 122 for detecting the proxy agents 114 deployed within the SAN 106, and a load balancing module 124 for determining and managing load on the proxy agents 114. The gateway 116 communicates with the proxy agents 114 using request messages. In one implementation, the gateway 116 broadcasts requests to the proxy agents 114 based on a proxy agent map listing all the proxy agents 114 registered with the gateway 116. In another implementation, the request messages are based on Service Location Protocol (SLP).

The proxy agents 114, which were previously associated with the gateway 116 as gathered from the proxy agent map, respond to the broadcast request messages received from the gateway 116. The response from the previously associated proxy agents 114 is used by the gateway 116 for ascertaining the state of the respective proxy agents 114. In another implementation, the gateway 116 updates the information, such as the devices 102 and 106 associated with proxy agents 114, present in the proxy agent map.

In one implementation, the gateway 116 determines the proxy agents 114 that have failed to respond to the broadcast request, based on the proxy agent map. In such cases, the gateway 116 categorizes the non-responding proxy agents 114 as failed. Similarly, the gateway 116 on receiving a response from the proxy agents 114 registers the newly detected proxy agents 114 which were previously unregistered.

In one implementation, the gateway 116 is configured to allow detection by one or more proxy agents 114 deployed in the SAN 106. For example, any of the proxy agents 114 not associated with a load balancing gateway, say the gateway 116, broadcasts a request message. The gateway 116 on receiving the request message will transmit a response to the proxy agent 114 from which the request message was received. On receiving the response, the proxy agent 114 register with the responding gateway 116. Once registered, the proxy agents 114 are capable of receiving and responding to the requests, for example, from the CMS 108 routed through the gateway 116.

The load balancing module 124 included within the gateway 116 monitors and manages the load handled by the proxy agents 114. The load handled by a proxy agent, such as any one of the proxy agents 114, is based on the number of management requests pending with the proxy agent. In one implementation, the load balancing module 124 categorizes the proxy agents 114 based on a threshold load value evaluated adaptively, i.e., based on the number of management requests pending with the proxy agents 114. The concepts relating to the interaction between the proxy agents 114 and the gateway 116, and relating to adaptive load balancing implemented by the gateway 116 are explained in detail in conjunction with FIGS. 2-7

Figure 2:
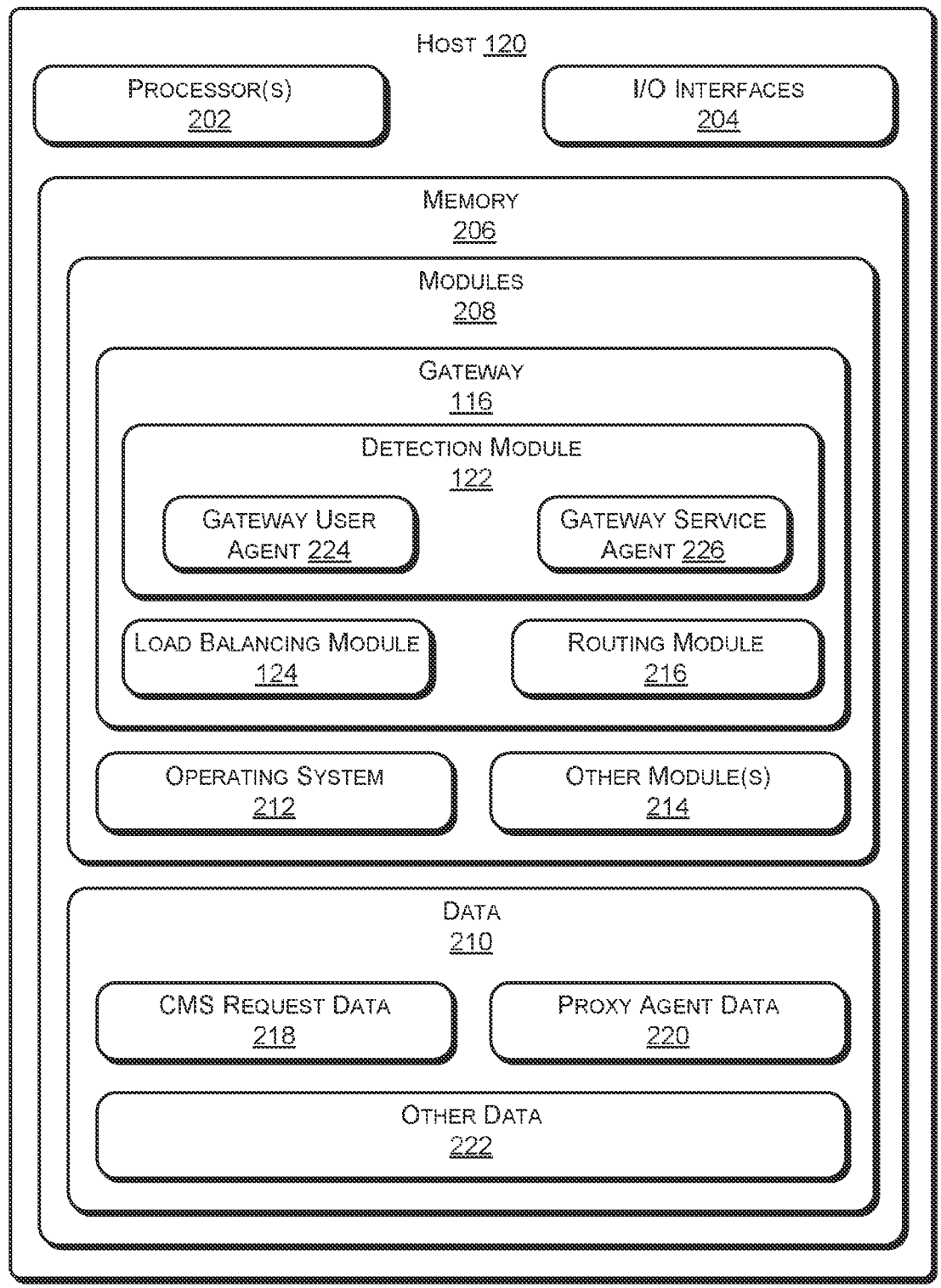
FIG. 2 illustrates an exemplary computing-device hosting a gateway for implementing network device management as described in FIG. 1, according to an embodiment of the present invention.

FIG. 2 illustrates the exemplary components of the host 120 hosting the gateway 116, according to an embodiment of the present invention. The host 120 can include one or more processor(s) 202, I/O interface(s) 204 and memory 206. Processor(s) 202 can be a single or multiple processing units. The processor(s) 202 can be implemented as one or more microprocessors, microcomputers, microcontrollers, digital signal processors, central processing units, state machines, logic circuitries, or any devices that manipulate signals based on operational instructions. Among other capabilities, the processor(s) 202 are configured to fetch and execute computer-readable instructions and data stored in the memory 206.

The I/O interfaces 204 may include a variety of software and hardware interfaces, for example, interface for peripheral device(s) such as a keyboard, a mouse, an external memory, a printer, etc. Further, the interface 204 may enable the host 120 to communicate with other computing devices, such as web servers and external databases. The I/O interfaces 204 may facilitate multiple communications within a wide variety of protocols and networks, such as network 118, including wired networks, e.g., LAN, cable, etc., and wireless networks, e.g., WLAN, cellular, satellite, etc. For the purpose, the I/O interfaces 204 may include one or more ports for connecting to a number of computing devices, such as the CMS 108.

The memory 206 can include any computer-readable medium known in the art including, for example, volatile memory (e.g., RAM) and/or non-volatile memory (e.g., flash, etc.). The memory 206 also includes module(s) 208, and data 210. The module 208 includes routines, programs, objects, components, data structure, etc., that perform particular task or implement particular abstract data types. In one implementation, the module 208 includes the gateway 116, an operating system 212, and other module(s) 214. Other module(s) 214 includes programs that supplement applications implemented by the host 120. The gateway 116 further includes the detection module 122, the load balancing module 124 and a routing module 216. As indicated previously, the detection module 122 detects the proxy agents 114 and the load balancing module 124 balances the load on the proxy agents 114. The routing module 216 routes the requests, for example from the CMS 108, to the proxy agents 114.

The data 210 includes CMS request data 218, proxy agent data 220, and other data 222. The CMS request data 218 stores one or more requests received from the CMS 108 or any other user, such as the user 110. The proxy agent data 220 includes data related to all the proxy agents 114. Examples of such data include, but are not limited to, IP address of the proxy agents 114, list of devices 102 and 106 associated with the proxy agents 114. The other data 222 includes data that is generated as a result of the execution of one or more modules in the module 208. The gateway 116 further includes a gateway user agent 224 and a gateway service agent 226 for communicating with one or more proxy agents 114. The working of the gateway user agent 224 and the gateway service agent 226 would be further understood in conjunction with FIG. 2.

As mentioned in conjunction with FIG. 1, the gateway 116 implements network device management by monitoring and managing the load on the proxy agents 114 and by managing and controlling the detection of the proxy agents 114 deployed in the SAN 106. These aspects are described in greater detail in the following portions of the Detailed Description.

Load Balancing of Proxy Agents

Concepts related to the load balancing of one or more proxy agents are described. In one implementation, the load balancing module 124 is configured to monitor and balance the load handled by each of the proxy agents 114. The evaluation of the load being handled by any of the proxy agents 114 is based on the number of management requests that are pending with the proxy agents 114. As described previously, the proxy agents 114 receive management requests from either the CMS 108 or the user 110.

In one implementation, the load balancing module 124 determines the load on one or more of the proxy agents 114 based at least on two parameters, namely a threshold interval and a threshold load. The threshold interval specifies the time interval at which the threshold load is to be evaluated and load balancing between the proxy agents 114 to be implemented. In one implementation, the threshold interval varies inversely with the total number of management requests received by the proxy agents 114. Therefore, the threshold interval would be small in case a large number of management requests are pending with the proxy agents 114. Hence, for shorter threshold intervals, i.e., in scenarios where the load on the proxy agents 114 is high, the threshold load calculation and load balancing are performed frequently. Conversely, when the proxy agents 114 are under-loaded or balanced, the threshold interval would be large and the threshold load calculation and load balancing are done less frequently. Thus, the threshold interval changes adaptively based on the load on the proxy agents 114.

The threshold interval varies dynamically with the rate of change of the state of the system, for example, network 100. In one implementation, the threshold interval is calculated by the load balancing module 124 by estimating the number of management requests that any one of the proxy agents 114, like the proxy agent 114-1, would be handling in the next subsequent interval. The number of the management requests that would be handled by the proxy agent 114-1 can be estimated based on total number of management requests received by and the number of management requests pending with the proxy agent 114-1.

Once the threshold interval is calculated, the load balancing module 124 evaluates the threshold load. In one implementation, the threshold load is based on the load on all the proxy agents 114 in the network 100. The threshold load is calculated adaptively for every interval specified by the threshold interval. Based on the threshold load, the load balancing module 124, for that interval, compares the load on each of the proxy agents 114 with the threshold load to categorize them as overloaded, under-loaded, or balanced. The load balancing module 124 then balances the load on the proxy agents 114 based on the categorization by transferring all or part of the pending management requests from the overloaded to the under-loaded or balanced proxy agents 114. In one implementation, the load balancing gateway routes subsequent incoming management request messages to under-loaded or balanced proxy agents 114.

In one implementation, the threshold interval is calculated by first estimating the average number of requests to be handled for the k+1 interval based on the following equation:

$$R_{Avg} = (R_{total}(k) + R_{back\,log}(k))/n \quad (1)$$

where $R_{total}(k)$ is the total number of management requests received in the $k^{th}$ interval and $R_{backlog}(k)$ is the number of backlogged management requests, i.e., the management requests pending with the proxy agents 114, in the $k^{th}$ interval.

The threshold interval $T_{interval}$ is calculated based on the following equations:

$$T_{interval} = \text{Current Time} + T_{k+1} \quad (2)$$

where $T_{k+1} = A/R_{Avg}$
where A is a user defined constant.

At the end of each threshold interval evaluated by the load balancing module 124, all the proxy agents 114 provide the gateway 116 information about the number of requests pending with the proxy agents 114, i.e., the number of requests that the proxy agents 114 were not able to handle within the threshold interval.

In one implementation, the load balancing module 124 calculates the load factor $L_i$, i.e., the load, for each of the proxy agents 114, using the following equation:

$$L_i = K^*(R_{backlog}/R_{total}) \quad (3)$$

where $R_{total}$ is the total number of management requests received by a proxy agent 114 in a time interval in which the load balancing is to be implemented, for example, the threshold interval. $R_{backlog}$ is the total number of management requests pending with the proxy agent 114 in the given time interval, and K is a user defined constant. Based on the load factor $L_i$, the load balancing module 124 determines the threshold load $T_{Load}$ using the following equation:

$$T_{Load} = \frac{\left(\sum_{i=1}^{n} L_i\right)}{n} \quad (4)$$

The threshold load obtained based on the above equations is considered to be equivalent to the ideal load as experienced by a perfectly balanced system. The value of the $T_{Load}$ is taken to be the load for the duration of the interval as represented by $T_{interval}$. Based on the $T_{Load}$, the load balancing module 124 can classify the proxy agents 114 as under-loaded, overloaded, or balanced.

Based on this determination, the load balancing module 124, and in turn the gateway 116, transfers the pending request of overloaded proxy agents, such as the proxy agent 114-1, to an under-loaded or balanced proxy agent, such as a proxy agent 114-2. In one implementation, the load balancing module 124 may also save the load information, the threshold load, and the threshold interval in the proxy agent data 220. In another implementation, the gateway 116 transfers a portion of the total number of management requests from the overloaded proxy agents, such as proxy agent 114-1, to an under-loaded or balanced proxy agent, such as proxy agent 114-2.

In one implementation, the gateway 116 is configured to direct subsequent management requests to under-loaded or balanced proxy agents, such as the proxy agent 114-2. To this end, the routing module 216 receives the load information associated with the proxy agents 114 from the load balancing module 124. Based on the load information the routing module 216 routes the subsequent management request to the least loaded proxy agent, for example, the proxy agent 114-2. In one implementation, if more than one proxy agents 114 have same load then the routing module 216 may choose one of the proxy agents 114, randomly or based on a predefined logic.

The concept of load balancing has been described above in conjunction with balancing of load associated with one or more proxy agents only for the purposes of illustrations. It would be appreciated that the above concept of load balancing of proxy agents applied for other computing resources that are known in the art, would be within the scope of the present subject matter.

Figure 3:
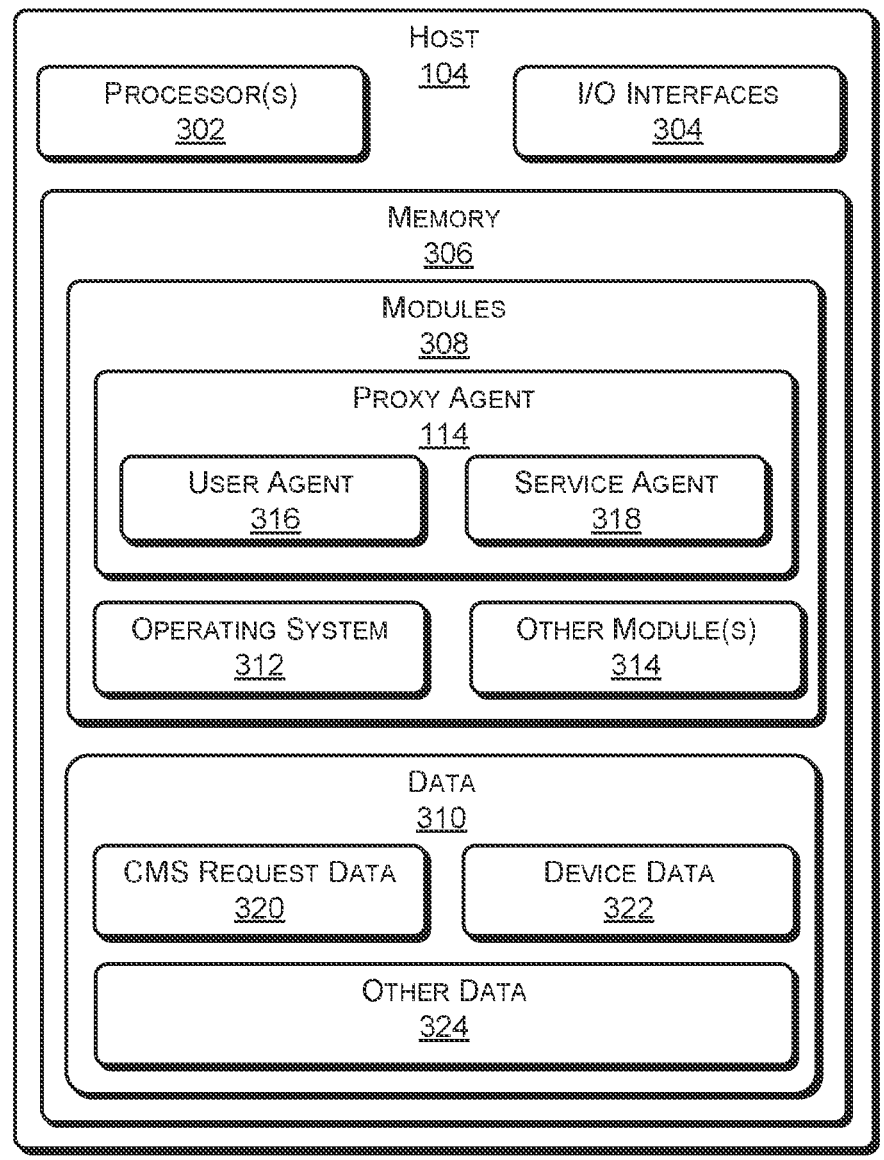
FIG. 3 illustrates an exemplary computing-device hosting a proxy agent for implementing network device management as described in FIG. 1, according to an embodiment of the present invention.

FIG. 3 illustrates the exemplary components of the host 104 hosting a proxy agent 114, according to an embodiment of the present invention. The host 104 can include one or more processor(s) 302, I/O interface(s) 304, and a memory 306. The processor(s) 302 can be a single or multiple processing units. The processor(s) 302 can be implemented as one or more microprocessors, microcomputers, microcontrollers, digital signal processors, central processing units, state machines, logic circuitries, or any devices that manipulate signals based on operational instructions. Among other capabilities, the processor(s) 302 are configured to fetch and execute computer-readable instructions and data stored in the memory 306.

The I/O interfaces 304 can include a variety of software and hardware interfaces, for example, interface for peripheral device(s) such as a keyboard, a mouse, an external memory, a printer, etc. Further, the interface 304 may enable the host 104 to communicate with other computing devices, such as web servers and external databases. The I/O interfaces 304 may facilitate multiple communications within a wide variety of networks and protocol types, including wired networks (e.g., LAN, cable, etc.) and wireless networks (e.g., WLAN, cellular, satellite, etc.), such as the network 118 and the SAN 106. In one implementation, the I/O interfaces 304 may include one or more ports for connecting to a number of computing devices over the network, such as the storage devices 102, or computing-devices hosting the gateway 116.

The memory 306 can include any computer-readable medium known in the art including, for example, volatile memory (e.g., RAM) and/or non-volatile memory (e.g., flash, etc.). In one implementation, the memory 306 includes module(s) 308, and data 310. The module 308 includes routines, programs, objects, components, data structure, etc., that perform particular task or implement particular abstract data types. In one implementation, the module 308 includes the proxy agent 114, an operating system 312, and other module(s) 314. The other module(s) 314 may include programs that supplement applications implemented by the host 104.

The proxy agent 114 further includes a user agent 316 and a service agent 318. The user agent 316 is configured to broadcast a request message to the gateway 116, for example, message requesting the service that the gateway 116 is capable of implementing, requesting registration with the gateway 116, etc. The service agent 318 in turn is configured to respond to request messages received from the gateway 116. In one implementation, the request messages from the gateway 116 are received from the gateway user agent 224.

Further, data 310 includes CMS request data 320 for storing management requests received from the gateway 116, a device data 322 for storing data related to all the devices 102 and 106 managed by all the proxy agents 114, and other data 324. The other data 324 may include data that is generated as a result of the execution of one or more modules in the module(s) 308. In one implementation, the device data 322 stores data related to the devices 102 and 106 associated with and being managed by the proxy agents 114.

The proxy agents 114, in one implementation, receive management requests from the gateway 116 and collect device information from the devices 102 and 106 associated with the proxy agents 114. As described previously, the proxy agents 114 route the device information collected from the devices 102 and 106 to the gateway 116. Furthermore, any management requests from the CMS 108 is routed to the relevant proxy agents 114 by the gateway 116, based on the load on each of the proxy agents 114 registered with the gateway 116. It would be appreciated that the gateway 116 manages the proxy agents 114 that are registered with it. The gateway 116 includes the registered proxy agents 114 in the proxy agent map.

The manner in which registering, updating, and discovering new proxy agents, failed proxy agents, and the gateway 116 is implemented, is described in conjunction with the components of FIGS. 2 and 3. The following portions describe, as per one implementation of the present invention, aspects related to communication between the proxy agents 114 and the gateway 116.

Proxy Agent Detection and Registration

In one implementation, the proxy agents 114 and the gateway 116 communicate with each other through their respective user and service agents. User agents, either in the gateway 116 or the proxy agents 114, transmit request messages and service agents can be used to transmit responses to request messages received. Examples of request messages include, but are not limited to, messages requesting a list of services that any one or more of the devices 102 and 106 are configured to implement.

In one implementation, the proxy agents 114 include the user agent 316 and the service agent 318 for transmitting a request message to other proxy agents 114 or the gateway 116 and for responding to request messages received from the gateway 116, respectively. Similarly, as mentioned before, the gateway user agent 224 and the gateway service agent 226 in the gateway 116 transmit a request message to the other proxy agents 114 and respond to request messages received from the proxy agents 114, respectively.

In one implementation, the gateway 116 uses the gateway user agent 224 and the gateway service agent 226 for detecting new proxy agents, for example, a proxy agent 114-3. The proxy agents can be deployed in the SAN 106 to monitor and manage one or more of the devices 102 and 106. To this end, the gateway 116 broadcasts a request message for one or more proxy agents 114 that are deployed in the SAN 106. The broadcasted request message is received by one or more proxy agents 114. On receiving the broadcasted request message, the service agent 318 included in the proxy agents 114 transmits responses to the request message. In one implementation, the responses can indicate one or more services that the devices 102 and 106 associated with the proxy agents 114 are configured to implement.

The responses provided by the service agent 318 are received by the gateway 116. In one implementation, the responses can be received by the detection module 122. The gateway 116, based on the received responses, prepares a list of all responding proxy agents 114 and compares the list of the responding proxy agents 114 with a list of proxy agents 114 that are registered with the gateway 116. In one implementation, the proxy agent map stored in the proxy agent data 220 indicates the proxy agents 114 that are registered with the gateway 116. Based on the comparison, the gateway 116 determines the proxy agents 114 that have responded for the very first time. For example, the gateway 116 may determine that the proxy agent 114-3 has responded for the first time. The gateway 116 then classifies the recently responding proxy agents 114, say the proxy agent 114-3, as newly added proxy agents. Once classified, the newly identified proxy agents 114 are registered with the gateway 116 from which they received the broadcast request message. In one implementation, the gateway 116 updates the proxy agent map stored in the proxy agent data 220 with the information associated with the newly registered proxy agents 114. In another implementation, the gateway 116 updates the details of the previously registered proxy agents 114 in the proxy agent map stored in the proxy agent data 220.

Similarly, in some cases, one or more of the proxy agents 114, say a proxy agent 114-4, may fail to respond to the request message broadcasted by the gateway 116. In such cases, the gateway 116 compares the list of the responding proxy agents 114 with the proxy agent map stored in the proxy agent data 220. The gateway 116 determines the proxy agents 114 that have failed to response, based on the comparison, and classifies non-responding proxy agents 114 as failed. In one implementation, the gateway 116 then routes the management requests from the CMS 108 from the failed proxy agent, say proxy agent 114-3, to one or more active proxy agents 114. In another implementation, the failure of the proxy agent 114-3 is notified to a system administrator, such as the user 110.

In another implementation, the proxy agents 114 register with the gateway 116 by sending relevant information, such as IP address of the proxy agents 114, port address, number of devices associated with it, etc. On receiving the information associated with the proxy agents 114, the gateway 116 compiles the received information. The compiled information can be stored in a database either within the host 120 or a database that is externally associated with the host 120. In yet another implementation, the gateway 116 distributes the compiled information of the proxy agents 114 to all the associated proxy agents 114. The distribution of the information allows all the proxy agents 114 associated with the gateway 116 to be aware of each others presence. In one implementation, the proxy agents 114 can transfer the load from an overloaded proxy agent, such as the proxy agent 114-1, to an underloaded or balanced proxy agent, say proxy agent 114-2 based on the distributed information.

The relevant information provided by the proxy agents 114 can be represented in a variety of formats. In one implementation, the relevant information of the proxy agents 114 is represented as shown in FIG. 3a. FIG. 3a illustrates an exemplary format used by the proxy agents 114 to communicate relevant information to the gateway 116, according to an embodiment of the present invention. As seen from FIG. 3a, the relevant information includes information pertaining to their IP addresses, port address, information related to the device, such as the devices 102 and 106, managed by the proxy agents 114, etc. As mentioned previously, in one implementation, this information is stored in the proxy agent data 220.

In one implementation, the proxy agents 114 are also configured to detect and discover other gateway 116 with which the proxy agents 114 can register. For example, the user agent 316 included within the proxy agents 114, broadcasts a request message, requesting a gateway, such as the gateway 116, to respond. The broadcast message can be received by the gateway 116. The gateway service agent 226, included within the gateway 116, responds on receiving the request message. In one implementation, the response from the gateway 116 includes information related to the gateway 116, such as IP address, etc. The proxy agents 114 registers with the gateway 116 based on the information included within the response.

It would be appreciated that the communication between the gateway user agent 224 and the gateway service agent 226 of the gateway 116, and the user agent 316 and the service agent 318 of the proxy agents 114 can be implemented in many ways. In one implementation, the communication between the gateway 116 and the proxy agents 114 is based on Service Location Protocol (SLP).

Exemplary methods for network device management are described with reference to FIGS. 4 to 7. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communication network. In a distributed computing environment, computer executable instructions may be located in both local and remote computer storage media, including memory storage devices.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

Figure 4:
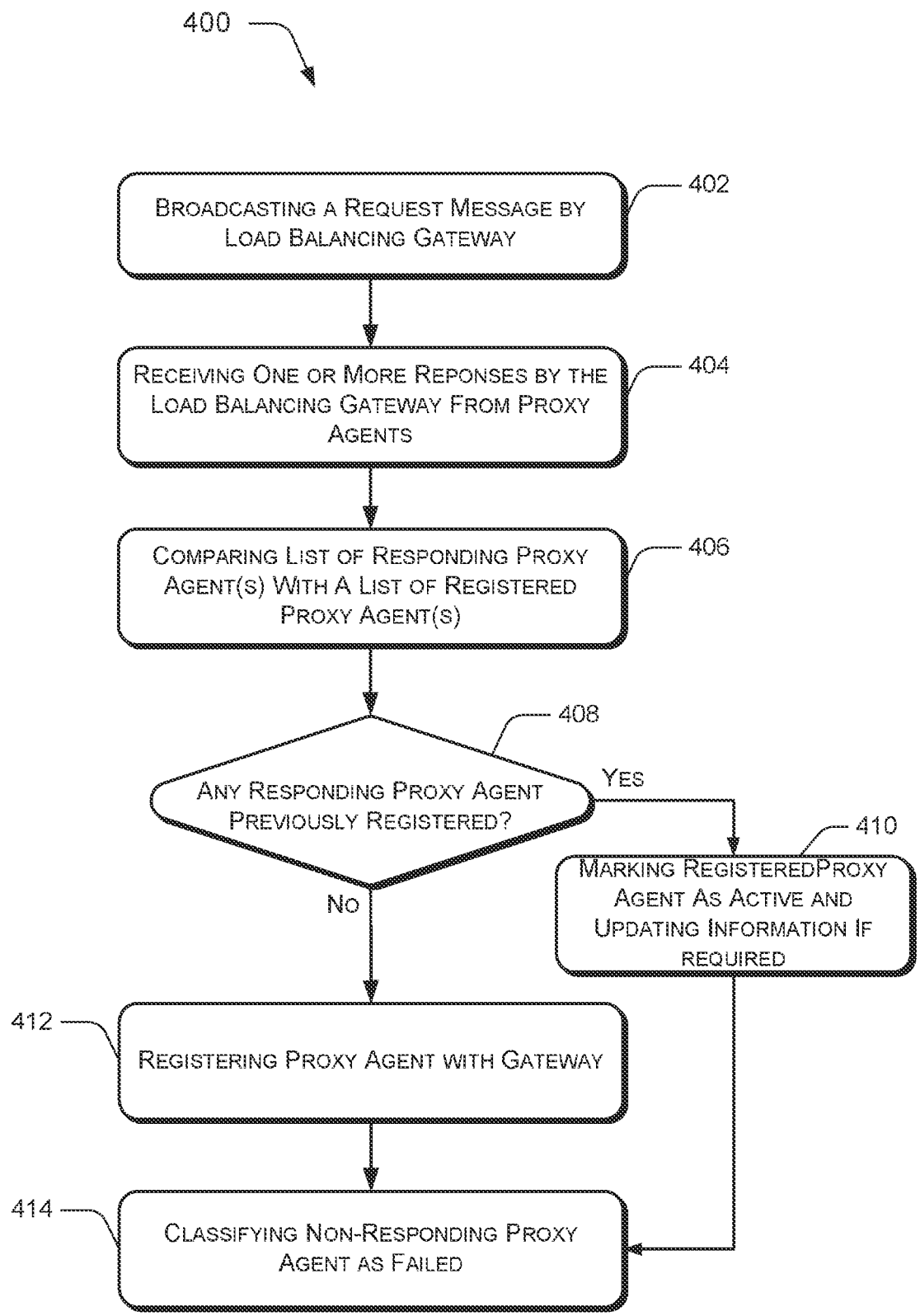
FIG. 4 illustrates an exemplary method for detecting proxy agents in a network, according to an embodiment of the present invention.

FIG. 4 illustrates an exemplary method 400 for automatic discovery of newly added or failed proxy agents or both, according to an embodiment of the present invention. At block 402, a request message is broadcasted by a load balancing gateway, for example, the gateway 116. In one implementation, the gateway user agent 224 included in the gateway 116, broadcasts the request message for one or more proxy agents 114, over the network 118. In another implementation, the request message requests a list of services that any of the devices 102 and 106 are configured to implement.

At block 404, a response to the request message from the proxy agents is received by the load balancing gateway. For example, on receiving the broadcast request message from the gateway 116, the service agent 318 included in the proxy agents 114 transmits a response to the gateway 116. In one implementation, the response can be received by the detection module 122 included in the gateway 116.

At block 406, a list of all responding proxy agents, i.e., the proxy agents responding to the request message, is compared with a list of previously registered proxy agents. For example, the gateway 116 prepares a list of all the responding proxy agents 114. The gateway 116 compares the list of the responding proxy agents 114 with the one or more proxy agents 114 that are registered with the gateway 116. In one implementation, the proxy agent map lists the proxy agents 114 registered with the gateway 116.

At block 408, a determination is made to ascertain whether any of the responding proxy agents were previously registered with the load balancing gateway or not. For example, the gateway 116 compares the list of the responding proxy agents 114 with the proxy agent map stored in the proxy agent data 220 to determine whether a responding proxy agent, such as the proxy agent 114-3, is registered or not. If the gateway 116 determines that the proxy agent 114-3 is already registered with the gateway 116 which is the 'Yes' path from the block 408, it marks the proxy agent 114-3 as active at block 410. The gateway 116, if required, updates information associated with the proxy agent 114-3 stored in the proxy agent data 220. In another implementation, the detection module 122 determines whether the responding proxy agents 114 are registered with the gateway 116 or not. From the block 410, the method proceeds to block 414.

In case it is determined that the proxy agents under consideration, i.e., the one or more responding proxy agents 114, are not registered which is the 'No' path from the block 408, the load balancing gateway registers the proxy agents at block 412. For example, the gateway 116 registers the proxy agents, say proxy agent 114-4, if it determines that the proxy agent 114-4 is not registered. In one implementation, the gateway 116, on receiving a response from the proxy agent 114-3 for the first time, determines that a proxy agent 114-4 is not registered. Once the newly responding proxy agents 114 have been registered, the method proceeds to block 414.

At block 414, the non-responding proxy agents are classified as failed. As mentioned previously, the failed proxy agents, and therefore, the devices associated with the failed proxy agents, become unavailable to the load balancing gateway. The failed proxy agents, therefore, because of their unavailability fail to respond to request messages transmitted by the gateway 116. For example, the gateway 116, on comparing the list of the responding proxy agents 114 with the proxy agent map, determines that one or more of the proxy agents 114, say the proxy agent 114-5, have failed to respond to the request message broadcasted by the gateway 116. In such a case, the gateway 116 classifies the non-responding proxy agent 114-5 as a failed proxy agent.

Figure 5:
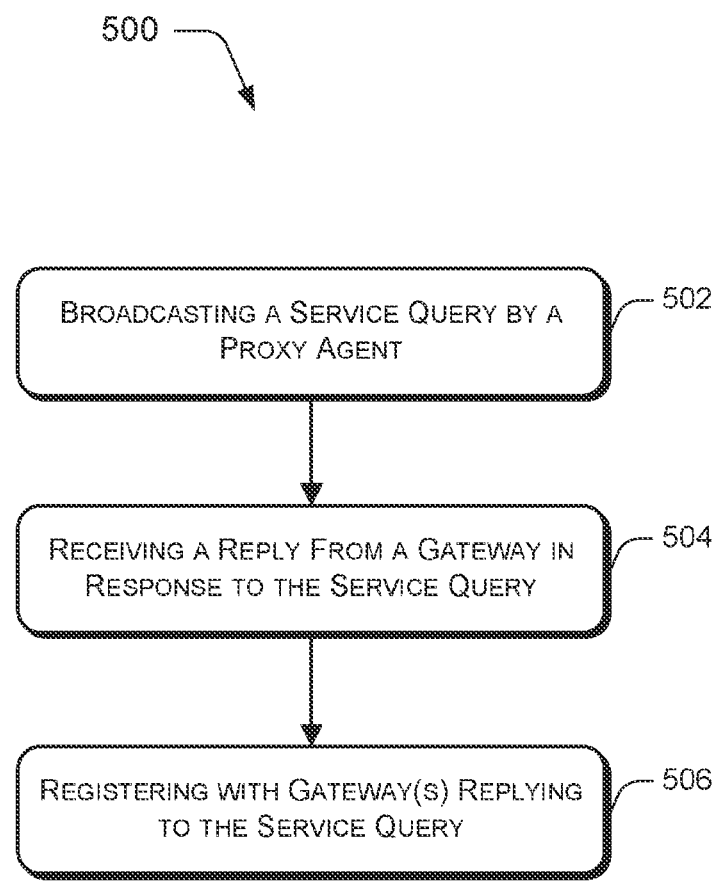
FIG. 5 illustrates an exemplary method for discovering a gateway in a network, according to an embodiment of the present invention.

FIG. 5 illustrates an exemplary method 500 for automatic discovery of a load balancing gateway, according to an embodiment of the present invention. At block 502, a request message is broadcasted by a proxy agent. For example, the user agent 316 included within any one of the proxy agents 114, broadcasts a request message, requesting any gateway to respond.

At block 504, a response from the load balancing gateway to the request message, is received by the proxy agent. For example, the gateway service agent 226, included within the gateway 116, responds on receiving the request message. The response is directed to the proxy agents 114 from which the request messages were received. In one implementation, the response from the gateway 116 includes information related to the gateway 116, such as IP address, etc.

At block 506, the proxy agents register with the load balancing gateway responding to the request messages that were broadcasted by the proxy agents. In one implementation, the proxy agents register with the load balancing gateway based on information included within the response. For example, the proxy agents 114, on receiving the response, register with the gateway 116 responding to the request message. In one implementation, the proxy agents 114 register by sending relevant information, such as IP address, the devices 102 and 106 being managed by the proxy agent, and so on.

Figure 6:
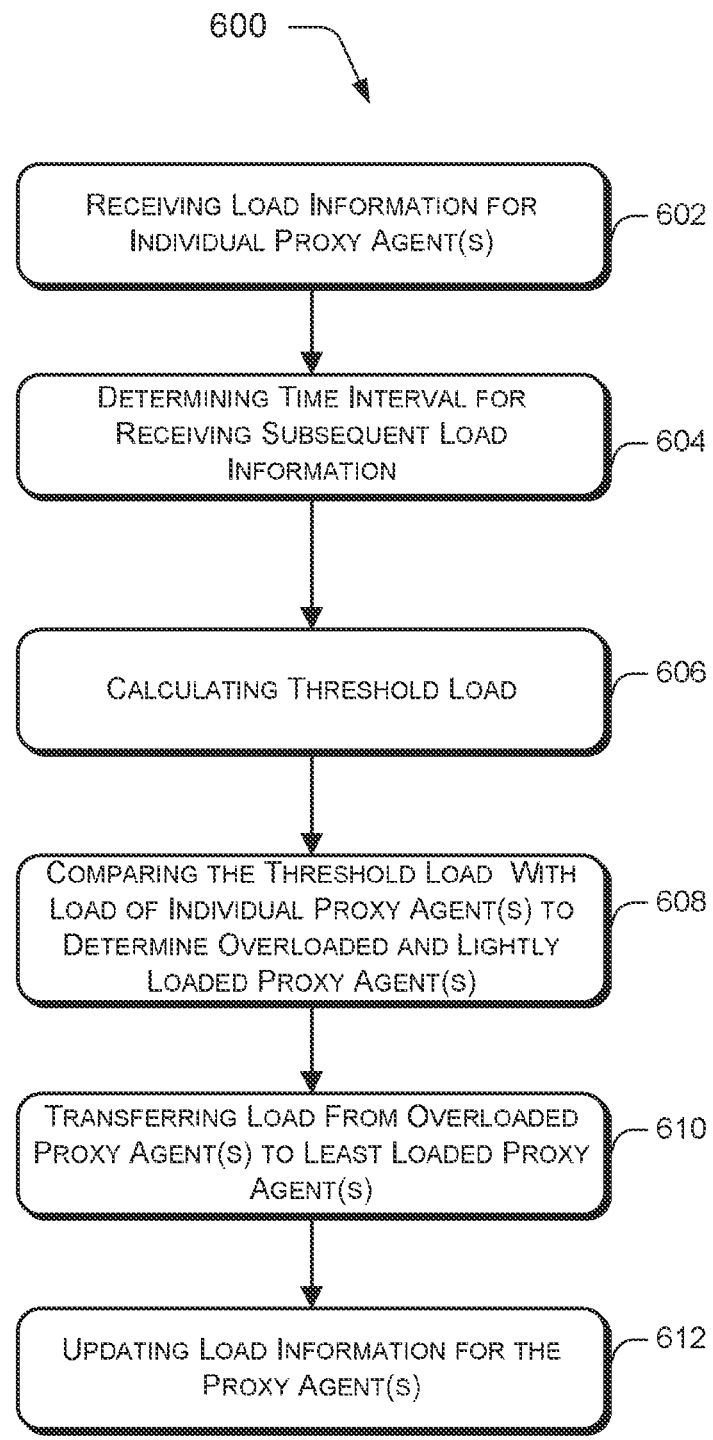
FIG. 6 illustrates an exemplary method for load balancing of the proxy agents, according to an embodiment of the present invention.

FIG. 6 illustrates an exemplary method 600 for implementing load balancing of one or more proxy agents, according to an embodiment of the present invention. As mentioned previously, the load being handled by any of the proxy agents is based on the number of management requests that are pending with the proxy agents. The load balancing of the proxy agents is based on at least two parameters, namely, threshold load and threshold interval. In one implementation, the threshold interval and the threshold load are calculated by the load balancing gateway 116.

At block 602, the load information associated with individual proxy agents is received. For example, the load balancing module 124 obtains the number of pending management requests and the total number of management requests for the proxy agents 114 at a given instance. The pending management requests are the requests that the proxy agents 114 were not able to execute. In one implementation, At block 604, the threshold time interval is determined based on the load information received by the load balancing gateway. For example, the load balancing module 124 calculates the threshold interval based on the average number of management requests to be handled by any of the proxy agent in a certain interval. The duration of the threshold interval varies with the entire load on the proxy agents 114. In one implementation, the management requests associated with the proxy agents 114 are stored in the CMS request data 218.

At block 606, the threshold load is calculated. For example, the load balancing module 124 calculates the threshold load for each of the proxy agents 114. The load balancing module 124 calculates the threshold load based on the average load experienced by the proxy agents 114. It would be noted that the threshold load thus obtained is a representation of the ideal load of a perfectly balanced system for the interval defined by the threshold interval.

At block 608, the load associated with each of the proxy agents is compared with the threshold load calculated at the block 606. The threshold load is considered to be the basis to determine whether any given proxy agent is lightly or overloaded. For example, the load balancing module 124 compares the load, estimated on the basis of the number of pending requests, for all the proxy agents 114 with the threshold load. The load balancing module 124, based on comparison, determines any one of the proxy agents 114, for example, the proxy agent 114-2, to be under-loaded, if the load associated with proxy agent 114-2 is less than the threshold load. Similarly, the proxy agent 114-1 would be an overloaded proxy agent, if its associated load is greater than or equal to the threshold load.

At block 610, the load from overloaded proxy agents is transferred to under-loaded or balanced proxy agents. For example, the load balancing module 124 transfers the pending request of the overloaded proxy agents, such as the proxy agent 114-1 to an under-loaded or balanced proxy agent, such as the proxy agent 114-2. The load balancing module 124 can either transfer all or part of the pending management requests that are pending with the proxy agent 114-1. In one implementation, the load balancing module 124 may also save the load information, the threshold load, and the threshold interval in the proxy agent data 220. In case two or more proxy agents 114 are marked as least loaded, then one of them is chosen randomly or based on predefined logic.

At block 612, load information for the proxy agents is updated. For example, the load balancing module 124 updates the load information of all the proxy agents 114 for which the load had been balanced, as described in the preceding blocks. The updating load information for the proxy agents 114 is subsequently used for implementing load balancing for a subsequent threshold interval.

Figure 7:
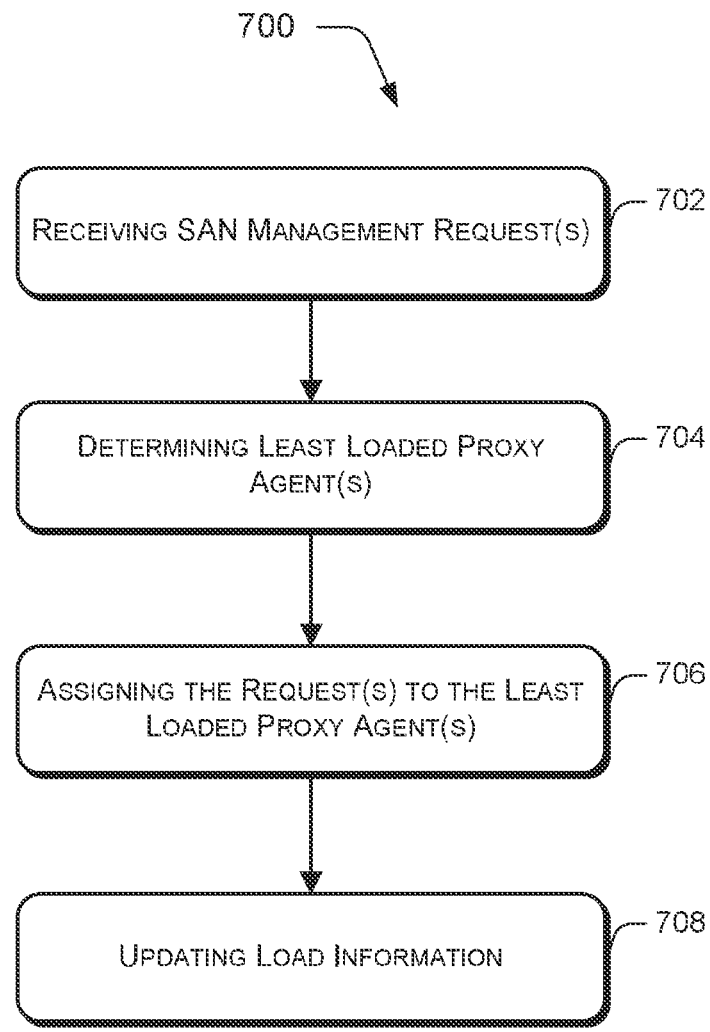
FIG. 7 illustrates an exemplary method for routing management requests to proxy agents, according to an embodiment of the present invention.

FIG. 7 illustrates an exemplary method 700 for routing of management requests to the proxy agents based on their load, according to an embodiment of the present invention. At block 702, management requests are received by the gateway. For example, the gateway 116 receives one or more management requests. The management requests are made by either the CMS 108 or the user 110. In one implementation, the gateway 116 may receive the management requests and store the requests in the CMS request data 218.

At block 704, the least loaded or balanced proxy agents are determined. Once determined, subsequent management requests are routed to the least loaded or balanced proxy agents. For example, the load balancing module 124 determines the least loaded of the proxy agents 114, say proxy agent 114-1, based on load information gathered from the proxy agents 114. In one implementation, the load balancing module 124 determines the least loaded of the proxy agents 114 based on the load information stored in the proxy agent data 220. In one implementation, the least loaded or the balanced proxy agents are determined based on the method as described in conjunction with FIG. 6.

At block 706, the management requests are routed to the least loaded or the balanced proxy agents. For example, the routing module 216, routes subsequent management requests to the least loaded of the proxy agents 114. In one implementation, the routing module 216 selects the least loaded of the proxy agents 114 in case two or more proxy agents 114 are found to be equally loaded. The selection by the routing module 216 can be random or can be based on a predefined logic.

At block 708, load information, associated with the proxy agents to which the management request were assigned, is updated. For example, the load balancing module 124 updates the load information associated with the least loaded of the proxy agents 114. In one implementation, the load information associated with the least loaded of the proxy agents 114 is stored in the proxy agent data 220. The updated load information can be used to determine the proxy agents 114 to which the subsequent management requests may be routed.

CONCLUSION

Although implementations for network device management have be understood that the scope of the claimed subject matter is not necessarily limited to the specific features or methods described. Rather, the specific features and methods are disclosed as exemplary implementations for network device management. For example, the specific features or methods would also be applicable to other forms of computing resources.

We claim:

1. A method comprising:
calculating, via a processor, a threshold interval based at least on a number of management requests pending with a plurality of proxy agents deployed in a network, wherein the threshold interval decreases as the number of management requests pending with the plurality of proxy agents increases and the threshold interval is based in part on an estimate of a number of management requests to be received with the plurality of proxy agents within a period of time;
calculating, via a processor, a threshold load based at least on the number of management requests pending with the plurality of proxy agents;
comparing, within the threshold interval, the threshold load with a load associated with each of the plurality of proxy agents;
determining whether each of the plurality of proxy agents is one of overloaded, under-loaded, and balanced based in part on the threshold load and the threshold interval; and
balancing the load associated with each of the plurality of proxy agents based on the determining by transferring a portion of the management requests pending with overloaded proxy agents to one of under-loaded proxy agents and balanced proxy agents.

2. The method as claimed in claim 1, wherein the balancing the load comprises routing subsequent management requests to one of under-loaded proxy agents and balanced proxy agents.

3. The method as claimed in claim 1 further comprising storing information of the load associated with the plurality of proxy agents.

4. The method as claimed in claim 1 further comprising transmitting the threshold interval and the threshold load to the plurality of proxy agents.

5. The method of claim 1, wherein the proxy agents manage a plurality of storage devices based on the management requests received from a central management station.

* * * * *